UNITED STATES PATENT OFFICE.

WILLIAM SHARP, OF PORTLAND, MAINE.

IMPROVEMENT IN PREPARING AND PRESERVING FISH.

Specification forming part of Letters Patent No. 143,386, dated September 30, 1873; application filed February 3, 1873.

*To all whom it may concern:*

Be it known that I, WILLIAM SHARP, of Portland, in the county of Cumberland and State of Maine, have invented certain new and useful Improvements in Preparing and Preserving Fish as a new article of manufacture; and I do hereby declare the following to be a full and exact description of the same.

My invention relates, first, to an improved process for smoking, canning, and boiling fish in the cans; and, secondly, to the product of said improved process as a new article of manufacture, the characteristic differences between my product and the product produced by first smoking and then canning the fish being that my product is cooked and ready for immediate use when placed on the market for sale, and also that it will keep longer, not only from the fact of its being cooked, but because in the process all, or nearly all, air is driven from the cans.

In the first place, the fish, of any desired kind, are lightly salted and then put up in a house made for the purpose of smoking, where they are, by means of heat and smoke, lightly smoked, or as it is commonly called, cured. After this the fish, with or without butter, spice, or other sauce, are put into cans of tin or other suitable material, and the cans are set into a boiler and boiled a sufficient length of time to completely heat their contents. They are then removed from the boiler and tapped, or in other words, a small perforation is made in each can to permit the escape of the heated air within. As soon as the air has escaped the perforations are closed tightly, and the cans put back into the boiler and boiled sufficiently to heat or cook their contents, when they are taken from the boiler and allowed to cool, which completes the process.

The time for boiling should be about two, or two and a half, hours before tapping and two or three hours after tapping, depending, to some extent, however, on the violence of the boiling.

I am fully aware that it is no new thing to preserve fish by salting and smoking them; but when treated in this manner so as to effectually preserve them in warm weather they must be salted so hard and smoked so dry and hard that they cease to be a delicacy. I am equally well aware that it is not new to preserve meats, fresh fish, &c., by canning them; but when thus canned fresh fish are altogether a different article of food from the fish prepared and preserved by my improved method. I therefore employ the salting and smoking only so far as to give a delicate flavor to the fish, which is modified and perfected, and the character of the food improved, by the subsequent boiling. The sealing of the cans then effectually excludes the air and preserves the improved article of diet without any deterioration for any length of time in any climate. I am also fully aware that it is not new to smoke and can fish, and I therefore lay no claim to such invention when the boiling process is not also applied to the fish in the cans, which cooks them so that they are ready for immediate use, besides preserving them more effectually and rendering them a greater delicacy.

What I claim as new is—

1. The process of preparing and preserving fish as an article of food by smoking, and subsequently canning and boiling them in the cans, substantially as described.

2. The improved article of manufacture, obtained by first smoking the fish and subsequently canning and boiling them in the cans, as and for the purpose set forth.

WILLIAM SHARP.

Witnesses:
 OSCEOLA JACKSON,
 HENRY B. CLEAVES.